(12) United States Patent
Schaefer

(10) Patent No.: US 7,045,038 B1
(45) Date of Patent: May 16, 2006

(54) PROCESS FOR TREATING WASTE OIL

(75) Inventor: Frederick Anthony Schaefer, Colorado Springs, CO (US)

(73) Assignee: Industrial Microwave Technologies, Inc., Knoxville, TN (US)

( * ) Notice: Subject to any disclaimer, the term of this patent is extended or adjusted under 35 U.S.C. 154(b) by 0 days.

(21) Appl. No.: 09/669,400

(22) Filed: Sep. 22, 2000

Related U.S. Application Data

(60) Provisional application No. 60/198,630, filed on Apr. 20, 2000, provisional application No. 60/171,915, filed on Dec. 21, 1999.

(51) Int. Cl.
*B01D 3/00* (2006.01)
*B01D 17/00* (2006.01)
*C10M 175/02* (2006.01)

(52) U.S. Cl. .................. 196/120; 196/14.52; 422/285; 422/288; 204/158.21; 208/184; 208/185; 208/187; 208/189

(58) Field of Classification Search ................ 208/179, 208/184, 185, 187, 188, 189; 196/120, 14.52; 204/158.21; 422/285, 288
See application file for complete search history.

(56) References Cited

U.S. PATENT DOCUMENTS

| | | | |
|---|---|---|---|
| 4,148,614 A | | 4/1979 | Kirkbride |
| 4,406,778 A | * | 9/1983 | Borza et al. ................. 208/179 |
| 4,522,707 A | * | 6/1985 | Kriegel et al. ............... 208/180 |
| 4,582,629 A | * | 4/1986 | Wolf .......................... 210/708 |
| 4,797,198 A | * | 1/1989 | Wetzel et al. .................. 201/23 |
| 4,824,570 A | * | 4/1989 | Bethuel et al. .............. 210/511 |
| 4,938,876 A | * | 7/1990 | Ohsol ......................... 210/177 |
| 5,344,493 A | | 9/1994 | Jackson |
| 6,083,399 A | | 7/2000 | Jameson et al. |

FOREIGN PATENT DOCUMENTS

| | | | |
|---|---|---|---|
| DE | 3038728 A | * | 4/1982 |
| DE | 3224114 A | * | 12/1983 |
| WO | WO 00/52118 | | 9/2000 |
| WO | WO 01/37961 | | 5/2001 |

* cited by examiner

*Primary Examiner*—Walter D. Griffin

(57) ABSTRACT

There is disclosed a burnable used oil fuel product by the process comprising:
(a) obtaining a used oil sample having at least 1% (by weight) aqueous substances;
(b) heating the used oil sample to a temperature of from about 20° C. to about 60° C.; and
(c) extracting a volume of water from the heated used oil by adding super critical $CO_2$.

9 Claims, 7 Drawing Sheets

PROCESS FOR TREATING WASTE OIL

RELATED APPLICATIONS

The present invention claims priority on provisional patent applications, Ser. No. 60/171,915, filed on Dec. 21, 1999, and Ser. No. 60/198,630, filed on Apr. 20, 2000.

TECHNICAL FIELD OF THE INVENTION

The present invention relates generally to the field of purification and more particularly to a method for purifying waste oil.

BACKGROUND OF THE INVENTION

Used lubricating and hydraulic oils are generated, for example, by automotive and commercial shops, large industrial manufacturing facilities, marine facilities and airline and railroad maintenance departments. Used oils are generally considered hazardous wastes and are heavily regulated. Generators of used oils are responsible for cradle to grave management (RICRA) of these waste streams. Generators have generally contracted with used oil recyclers to pick up the waste and remediate it or dispose of it under the laws that regulate the transport, processing and destruction of the various components that make up these particular waste streams. However, under current United States laws, having used oil picked up does not remove the potential liability from the generator. Moreover, such used oil can only be efficiently disposed of (e.g., through combustion) if it is treated to remove aqueous contamination.

There is no equipment available that can easily and cost-effectively remediate these waste streams on-site. The generators must contract with firms that have special expertise in reclaiming these waste streams as an on-site service. This service is costly. The predominant method of disposal of used oils is to contract with a used oil recycler. Depending on the characteristics of the oily waste stream and petroleum market conditions, the cost of this service varies. When crude oil prices were depressed (e.g., below $22 per barrel), used oil recyclers would pick up oily wastes that had less than 6% water (e.g., aqueous contamination) free of charge. If the waste had more than 6% water used oil recyclers would charge the generator a fee per volume obtained for disposal.

When used oil recyclers pick up oil from generators that had less than 6% water content, this oil is transported back to the used oil processing facility and put in a good oil storage tank to be sold as a substitute for # 2 burning fuel. When crude oil prices were depressed, used oil recyclers might sell this product for around $0.20 per gallon. With current volatile crude oil prices, the price for used oil can rise with the crude market. If the waste oil had more than 6% water content, it must be transported back to a plant for processing (removing water) before it can be resold as burning fuel and its price will be inverse to its water content. This process for removing water from used oils is complex, costly, time consuming and produces waste components that require further remediation (rag layer).

A typical process involves (for example at Aaron Oil, Mobile, Ala.) transferring used oils that come in on trucks from multiple generators to a used oil holding tank. Once the tank reaches a certain level, it is transferred to another process tank, where it is mixed to produce a consistent product. Once mixed, a sample is taken from the tank for process bench testing. Bench testing involves the heating of numerous samples and the addition of multiple demulsifer chemicals at various concentrations. After the samples are heated and dosed with demulsifiers, they are allowed to cool and visually inspected. This process can take up to two hours.

Visual inspection shows which demulsifier and at which concentration is most effective in breaking the water and solids out of the starting sample. The most successful demulsifier at minimal concentrations is picked for the actual production run. It should be noted that even with bench testing and a good result with a particular demulsifer, this does not always lead to a successful result during the production run, which requires the production batch to be processed again.

Once the optimal production demulsifier is chosen, the process tank, which often holds 60,000 liters, is heated by drawing off the bottom and running through a gas fired heater and put back into the top of the tank. This heating process goes on until the tank reaches about 60° C. (140° F.) and demulsifiers are added at the middle to the end of the heating process. The heating process takes between 8 to 12 hours to bring the 60,000 liter tank to temperature, at which point it is allowed to stand in a quiet condition for up to another 24 hours.

Near the end of the 24 hours, the tank is sampled to see how much water has been broken out from the starting used oil. Once it has been determined through sampling that the separation process has completed, the solids and water are drawn off and the water is treated in the waste-water treatment plant and solids go to disposal.

Above the water in the process tank is a rag layer (Off-Spec Oil). This layer contains mostly water but with high oil content and some solids. This waste stream must be disposed of at additional cost. Above the rag layer lies the good oil (On-Spec Oil) with less than 6% water content that is transferred to a good oil holding tank for resale as a substitute for #2 burning fuel. This batch process is complex (not fool proof), lengthy, and somewhat labor intensive. It is also costly having rising natural gas costs for heating and demulsifier costs.

Other techniques for treating used oil above 6% water have included, for example, gravitational settling that results in waste products consisting of a stable oil/water emulsion mixed with solid minerals. The emulsion material constitutes unusable waste that is stored in open pits or temporary holding tanks. Increasing regulatory and environmental pressure, and liabilities are forcing owners of these waste product impoundments to clean up these sites and safely dispose of the waste.

Other techniques for waste oil emulsion remediation include the use of gas-fired heaters, microwave heaters, microbes, centrifuges, and chemicals. However, these methods do not recover a fully marketable product. They provide only partial separation and typically leave large amounts of regulated waste. Those methods that do recover some marketable oil are inefficient, making satisfactory results difficult to obtain. Specifically, conventional heating methods suffer from slow heat transfer between the heating element and thick emulsions, accumulation of heavy layers of solid residue on heat transfer surfaces, and loss of volatiles. Chemical demulsifiers, such as alum and polyamines, can be used to separate oil/water emulsions, but these chemicals are subject to very strict government regulation concerning their discharge into public water. In addition, chemical treatment can be a relatively slow process with an inefficient separation of some emulsions.

Thus, there exists a need for an apparatus and process of treating waste oil above 6% water that recovers marketable oil efficiently and more economically. The present invention was made to address this need.

SUMMARY OF THE INVENTION

The present invention provides a burnable used oil fuel product by the process comprising:

(a) obtaining a used oil sample having at least 1% (by weight) aqueous substances;

(b) heating the used oil sample to a temperature of from about 20° C. to about 60° C.; and (c) extracting a volume of water from the heated used oil by adding super critical $CO_2$.

Preferably, the used oil sample has at least 6% (by weight) of aqueous substances so that greater value can be added to the oil through the inventive process. Preferably, the heating the sample step is accomplished by a microwave heating process. Most preferably, the microwave heating energy is about 2.45 GHz. Preferably, the extraction step is performed in a trapping vessel having a bottom valve for removing bottom components and a means for regulating pressure, whereby water and extracted solid constituents are removed from the bottom vessel. Preferably, the process further comprises settling the demulsified oil to allow for water and extracted solids to settle.

The present invention further provides a process for recovering burnable used oil fuel from a used oil sample, process comprising:

(a) obtaining a used oil sample having no more than 1% (by weight) aqueous substances;

(b) heating the used oil sample to a temperature of from about 20° C. to about 60° C.; and (c) extracting a volume of water from the heated used oil by adding super critical $CO_2$.

Preferably, the used oil sample has at least 6% (by weight) of aqueous substances so that greater value can be added to the oil through the inventive process. Preferably, the heating the sample step is accomplished by a microwave heating process. Most preferably, the microwave heating energy is about 2.45 GHz. Preferably, the extraction step is performed in an extraction vessel having a bottom valve for removing bottom components and a means for regulating pressure, whereby water and extracted solid constituents are removed from the bottom vessel. Preferably, the process further comprises settling the demulsified oil to allow for water and extracted solids to settle.

The present invention further comprises an apparatus for purifying waste oil, comprising:

(a) a preprocessing analyzer section connected to an input stream for waste oil and an output;

(b) a preprocessing switch controlled by the analyzer section having an input connected an analyzer section output and an output, the preprocessing switch having a first output and a second output;

(c) a heating section connected to the preprocessing switch output; and a microwave heating section connected to the second output; and (d) a demulsification section connected to the heating output and having an output located gravitationally lower for settling.

Preferably, the apparatus further comprises a preheating section connected upstream of the preprocessing switch. Most preferably, the preheating section is a resistance heater or a heat exchanger, or both. Preferably the heating section comprises both resistance heating and microwave heating. Most preferably, the microwave heating section comprises a waveguide and a slurry conduit extending through a portion of the waveguide. Most preferably, the waveguide includes a straight member between a first end and a second end, the first end is a curved member having a 45° "H"-plane bend of miter construction. Preferably, the apparatus further comprises a post processing analyzer section connected to a demulsifier output, and a post-processing switch connected to a post-processing analyzer section output of the post-processing analyzer section.

The present invention further provides an apparatus for purifying waste oil, comprising:

(a) a pump connected to the supply of waste oil creating a waste oil steam;

(b) a microwave heating section heating the waste oil stream to form a heated oil stream; and (c) a demulsification section having a super critical $CO_2$ inlet and a settling outlet lower than the inlet and connected to the microwave heating section.

Preferably, the apparatus further comprises an analyzer section that determines a percentage of water in the waste oil stream feed. Preferably, the microwave heating section comprises (a) a microwave generator; (b) a single mode waveguide connected to the microwave generator; and (c) a slurry running through the single mode waveguide. Most preferably, the microwave heating section further comprises a sensor connected to the microwave generator and determining an amount of reflected energy.

DETAILED DESCRIPTION OF THE INVENTION

Figure 1:
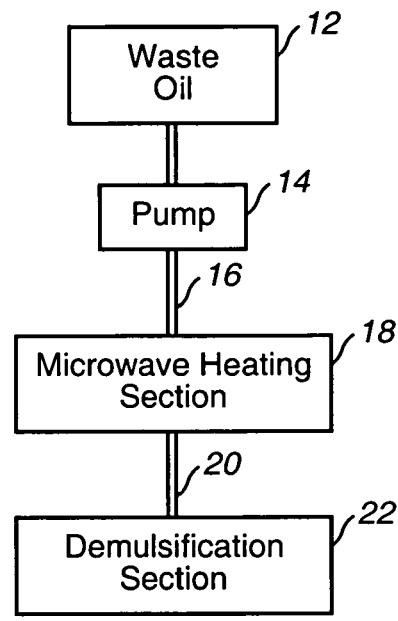
FIGS. 1–4 are block diagrams of systems for purifying waste oil in accordance with various embodiments of the inventive process.

The inventive process provides significant advantages over traditional used oil process technologies. For example, the inventive process is (1) a continuous process as opposed to a batch process; (2) does not require the use of typical demulsifer addition, thus eliminating this costly element and the labor and time spent bench testing different demulsifiers (i.e., the demulsifier can be recycled back), (3) not complex, making it amenable to be used by large used oil generators on-site; (4) does not produce a rag layer; (5) produces a purified good oil product that has higher end use value than traditional #2 used oil burning fuels; and (6) is a closed loop process without any environmental emissions.

Used oil generators can use the inventive process at the point of waste collection and process it (in situ). Based upon the data provided herein, the purified oil product has higher value than conventional used oil burning fuel produced by conventional processes. The product oil is suitable for use as a substitute for #6 oil that is used as a cutter stock in the production of Marine Diesel Oil (MDO). This product as a substitute for #6 oil has a current market value of $0.48 per gallon. In addition, the only operating cost other than labor (which should be minimal) is electricity to drive the pumps and produce heat energy. The electricity cost should be about $0.02 per liter at peak rates and $0.01 at off peak rates under worst case scenarios. The cost of demulsifier addition and rag disposal costs are eliminated. Importantly, there is an improved product quality.

Process

The first step is heating. Two different heating techniques that can be applied, depending on the fluid or other material to be processed. One uses microwave heating of the fluid and the other uses conventional heating techniques. The microwave heating method selectively heats the constituents of the material based upon the constituents loss tangents for microwaves at a given frequency. By creating a temperature differential between the constituents separation efficiency is enhanced. For example, at a microwave frequency of 2.45 GHz and a processing method for water in oil emulsions, the loss tangents for oil and water are 0.0084 and 0.12 respectively. A comparison of the microwave loss tangents of the oil and water shows that the water will absorb 93% of the available microwave energy at 2.45 GHz. Since the oil and water absorb microwave energy at different rates a stressful temperature differential across the interfaces of the emulsion components improves separation efficiency.

Microwaves reduce the zeta potential, which in turn reduces the potential energy holding the emulsion together. Polarized surfactant molecules at the oil-water interface are disturbed by microwave energy, causing a randomization of the stabilizing electrical potential. Thus, microwave heating of materials performs two functions. First, microwave radiation selectively heats the various constituents of the used oil material to cause temperature differentials to improve separation efficiency in a subsequent step, particular if the subsequent step uses supercritical fluids. Secondly, microwave radiation heats the total material volume by direct coupling of microwave energy into the used oil constituents and by conduction of heat from high coupling constituents to lower coupling constituents. In this way the total volume of the material is heated, which lowers used oil viscosity making pumping of the material easier and achieves the desired starting temperature for the subsequent step, particularly if the subsequent step uses supercritical fluids for extraction. Preferably, the temperature for the subsequent step is typically between 30° C. to 70° C. (and most preferably between 40° C. to 60° C.).

Microwave heating of used oil emulsions, has demonstrated enhanced separation efficiencies in terms of better yields and speed of separation. Microwave heating of emulsions enhances separation efficiency with the use of demulsifiers. Better results have been demonstrated using less demulsifier addition and lower temperatures than traditional processes (traditional process temperatures start at 60° C. and go to 80° C.).

The heating method can comprise any number of conventional heating techniques, such as gas fired heaters, metal tubing that is heated by band heaters through which the fluid flows, or heat transfer. Since not all fluids/materials are effectively heated with microwaves, these conventional heating alternatives can be employed when the used oil material to be processed has low dielectric values (i.e., poor microwave heating values) or the conventional heating process is more energy efficient for a particular product stream.

One can measure the diaelectric value of a used oil material and recognize when it is more effective to process that material with conventional heating means, such as when there is a lower water content below about 10% by volume. In these situations, conventional heating is used to bring the material to the appropriate starting temperature before the second extraction step (such as 30° C. to 70° C., most preferably about 60° C.).

After completion of the first step, the hot material is pumped for a second, extraction of water step. For example, the used oil material enters a hot material reservoir at pressures between 1.4 and 2.8 $kg/cm^2$. A 422 $kg/cm^2$ liquid pump then raises the pressure on the material between 105 to 352 $kg/cm^2$ and a second 422 $kg/cm^2$ $CO_2$ pump injects $CO_2$ into the material before the material enters a temperature controlled, 422 $kg/cm^2$ extraction vessel. Preferably, the extraction vessel is further heated with band heaters to maintain starting input temperature. $CO_2$ injection ranges from 10 parts $CO_2$ to 1 part used oil material or 5 parts $CO_2$ to 1 part used oil material. Supercritical fluid extraction, using $CO_2$ as the demulsifier after microwave processing, produces purified end products on a continuous bases while recycling the $CO_2$ in a closed loop system.

Supercritical fluids, such as $CO_2$, have both the gaseous property of being able to penetrate anything, and the liquid property of being able to dissolve materials into their components. Supercritical $CO_2$ has solvating powers similar to organic solvents, but with higher diffusivities, lower viscosity and lower surface tension. The solvating power is adjusted by changing the pressure and temperature. Supercritical fluids for extraction offers the advantages of being an inexpensive solvent that's contaminant free and less costly to dispose safely than organic solvents. For this reason, supercritical fluid $CO_2$ is the preferred reagent used to extract caffeine from coffee. For processing of oil, water and solid emulsions, $CO_2$ in its supercritical state dissolves emulsions into its components and because of the different densities of the components and the oils soluability in supercritical $CO_2$, the heavier components (water and solids) settle to the bottom of the extraction vessel and the supercritical $CO_2$ and purified oil rise to the top of the extraction vessel. Purified oil and $CO_2$ are removed to a second temperature controlled trapping vessel.

For the continuous production of purified oil products, a dynamic extraction is used where the supercritical $CO_2$ continuously flows (after the heating step) through the hot material transfer step and the extraction vessel (along with the emulsion) and out of the extraction vessel through a restrictor, which maintains high pressure in the extraction line and into a trapping vessel that maintains pressures of less than 162 $kg/cm^2$. The trapping vessel pressure is maintained below the pressure of the extraction vessel as the solute-containing (purified oil) supercritical fluid decompresses into the trapping vessels. Multiple trapping vessels and restrictors can be deployed at differing pressures to fractionate the exiting purified oil stream from the extraction vessel based upon differing weights of the oil components (example 30 weight oil versus 40 weight oil products). The remaining water and solid constituents that settle to the bottom of the extraction vessel, can be pulled off periodically by opening a valve at the bottom of the extraction vessel. The purified oil products in the trapping vessel are pulled off in a similar manner (except from the top of the extraction vessel) and the remaining $CO_2$ in the trapping vessel is reclaimed through the use of a cooling unit, $CO_2$ gas to liquid at 60 kg/cm² and a $CO_2$ gas condenser. The reclaimed $CO_2$ is sent back to the front end of the process, to be used again, in a continuous and closed loop manner.

In one used oil recycler test facility (Duquesne University, Pittsburgh, Pa.), a typical used slop oil sample was processing in the inventive continuous microwave processing system. Conventional processes used at this plant use heat and demulsifiers to break out water and solids to produce a burning fuel with less than 6% water content. This fuel is then sold to industrial burners for around $0.20 per gallon. Results from processing this sample exceeded typical performance achieved in traditional processes with the use of supercritical $CO_2$ as the demulsifier (albeit at a slightly higher expected energy cost). The purified oil had the appearance of clean motor oil with no visible solids or carbon content. The purified oil exhibited characteristics that will allow it to be sold as a feedstock that could be blended with marine diesel oil and command a $0.08 per gallon premium over the value of conventional used oil burning fuel.

Starting Slop Oil

The sample was analyzed prior to being sent to a test facility. The slop oil had the following characteristics:

| Analysis by centrifuge. | |
|---|---|
| Total BS & W | 22% (BS & W means, bottom sediments and water) |
| % Water | 17.6% |
| % Solids | 0.4% |
| % Rag layer | 4% |
| % Product/Oil | 78% |
| Water by distillation | |
| % Water | 28% |

The initial test configuration heated the emulsion to 60° C. in a multimode microwave cavity. The emulsion flowed through a high pressure, microwave transparent tube that was under high pressure between 35 kg/cm² and 350 kg/cm². $CO_2$ was injected within the microwave cavity on a 10 parts $CO_2$ to 1 part oil emulsion basis. Pressure in the extraction vessel was 350 kg/cm² and held at temperatures around 40° C.

A sight glass on the extraction vessel showed the oil mixing with the supercritical $CO_2$ and the solids and water dropping to the bottom of the extraction vessel and the oil in $CO_2$ moving to the top of the extraction vessel where it exited into the lower pressure (less than 126 kg/cm²) trapping vessel.

Results of Slop Oil Testing Program

The purified oil was taken from the trapping vessel, filtered after processing and sent to Environmental Science Corp. (ESC) (Mt. Juliet, Tenn.) for analysis. The results are as follows:

| Parameter | Method | Result Before | Result After | Units |
|---|---|---|---|---|
| Aluminum | 6010 | 180 | 10 | mg/kg |
| Arsenic | 6010 | 0.84 | 0.31 | mg/kg |
| Cadmium | 6010 | 0.32 | 0.32 | mg/kg |
| Chromium | 6010 | 0.60 | 0.15 | mg/kg |
| Iron | 6010 | 570 | 18 | mg/kg |

| -continued | | | | |
|---|---|---|---|---|
| Parameter | Method | Result Before | Result After | Units |
| Lead | 6010 | 4.5 | 2.5 | mg/kg |
| Ash Content | 2540G | 0.25 | 0.02 | % |
| Water Content | K.F. | 55 | 0.14 | % |
| Total Chlorine in oil | 9077C | 200 | 100 | mg/l |

The difference between the original analysis of water content or the slop oil before treatment and the analysis performed at ESC (28% water content versus 55%) may have been due to the sampling once at the test facility. The sample bottle at the facility had over time dropped out water to the bottom of the bottle, which appeared to represent about 15% of the total volume. When we drew off the before sample we might have been drawing off at a level with high water content.

Preliminary results of the analysis of the sample before and purified oil after processing showed effective/improved performance of the final product when compared to traditional used oil processing. Comparisons of before and after are as follows:

393 times reduction in water content
31 times reduction in iron content
18 times reduction in aluminum content
12.5 times reduction in ash content
2 times reduction in total chlorine in oil Additional Test Results The used oil facility also provided a typical tank bottom sample for processing. The inventive process displayed even better performance with this sample compared to the slop oil sample above, again with the use of supercritical $CO_2$ as the demulsifier.

While an analysis of the sample was not performed, a visual comparison showed a purified good oil product that was amber in color and a starting product that was dark black.

| Process | Process cost per gallon | |
|---|---|---|
| Potentially all oily waste streams (assumes, 5 parts $CO_2$ to 1 part emulsion) | at $0.08 per kW | $0.06 |
| | at $0.04 per KW | $0.03 |

| Zimmark Process |
|---|
| Recycling of lube and hydraulic oils for reuse. |
| At 4% demulsifier addition plus energy costs ($0.89 per gallon $0.91 for demulsifier). |
| At 1% demulsifier addition plus energy costs ($0.22 per gallon $0.24 for demulsifier). |

Energy costs are 0.23384 Kwh at $0.08 per KW adds $0.019 per gallon to the above demulsifier costs.

| Conventional Hydrocarbon Refining |
|---|
| Crude oil refining into end use products. |
| Crude oil costs over $30.00 per 55 gallon barrel or more |

-continued

Conventional Hydrocarbon Refining

| | |
|---|---|
| than $0.50 per gallon. Energy costs are 4.37 Kwh per gallon at $0.08 KW is $0.349 per gallon. | |
| Total processing costs are; | $0.71 |
| Conventional Used Oil Recycling for Burning Fuel | |
| Used Oil processing costs are per gallon | $0.04 to $0.05 |
| On-Site Vacuum Dehydration Service | |
| For reuse of machine tool and lube oil products. | $1.50 |
| PCB Transformer Waste Oil | |
| Cost for incineration is $1.50 per lb. | $12.00 |

Crude Oil Sludge Processing Service (on-site)

| | |
|---|---|
| The use of heat, demulsifiers and centrifuge on site costs: | $0.04 to $0.09 |
| Between, $2.00 and $5.00 per barrel. | |

An apparatus for purifying waste oil has a supply of waste oil. A preprocessing analyzer section is connected to an output stream of the supply of waste oil. A preprocessing switch is controlled by the analyzer section and has an input connected to an analyzer section output. The preprocessing switch has a first output and a second output. A conventional heating section is connected to the first output. A microwave heating section is connected to the second output. A demulsification section is connected to a conventional heating output and connected to a microwave heating output. As will be shown by the examples given herein, the process provides a significant improvement over the prior art and provides a highly marketable product.

FIG. 1 is a block diagram of a system 10 for purifying waste oil in an exemplified embodiment. The system 10 has a supply of waste oil 12. A pump 14 is connected to the supply of waste oil 12 and creates a waste oil stream 16. A microwave heating section 18 heats the waste oil stream 16 and forms a heated oil stream 20 or convention heat. A demulsification section 22 is connected to the microwave heating section 18. The two-step combination of microwave heating and then demulsification has proven to be highly effective for purifying certain classes of waste oil.

Figure 2:
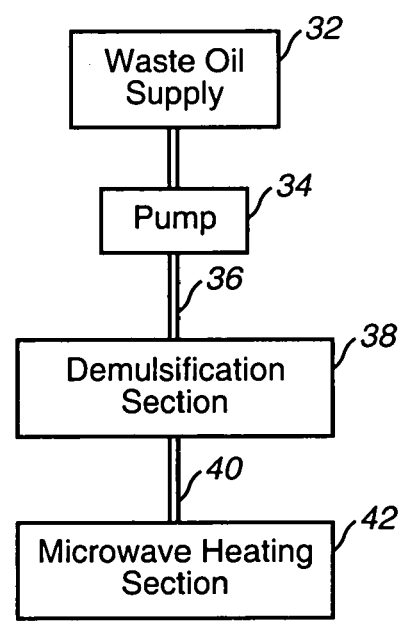

FIG. 2 is a block diagram of a system 30 for purifying waste oil. The system 30 has a supply of waste oil 32. A pump 34 is connected to the supply of waste oil 32 and creates a waste oil stream 36. A demulsification section 38 is connected to the pump 34 and forms a demulsified oil stream 40. A microwave heating section 42 heats the demulsified oil stream 40. The waste oil may be demulsified and then microwave heated or microwave heated and then demulsified. In most cases slightly better results are obtained by first microwave heating the oil and then demulsifying the waste oil.

Figure 3:
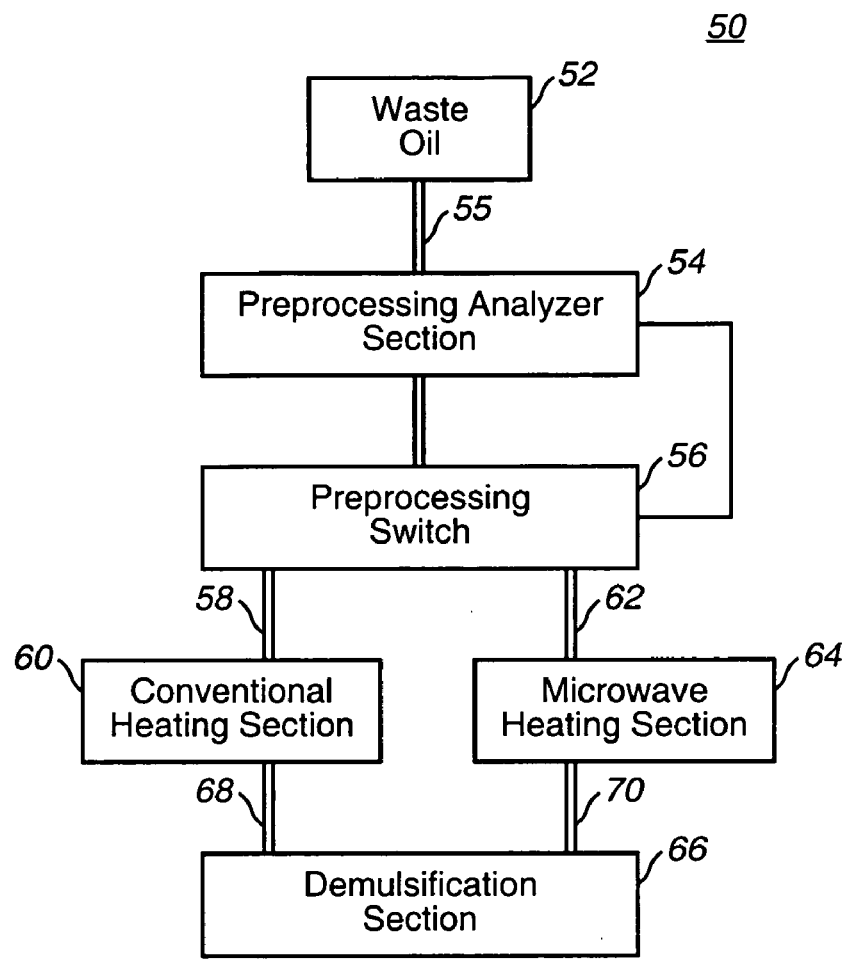

FIG. 3 is a block diagram of a system 50 for purifying waste oil. The system has a supply of waste oil 52. A preprocessing analyzer section 54 is connected to an output stream 55 of the supply of waste oil. A preprocessing switch 56 is controlled by the analyzer section 54. The preprocessing switch 56 has a first output 58 connected to a conventional heating section 60. A second output 62 of the preprocessing switch 56 is connected to a microwave heating section 64. A demulsification section 66 is connected to a convention heating output 68 and to a microwave heating section output 70. The preprocessing analyzer section measures a percentage of water in the waste oil stream. When the percentage of water is above a predetermined threshold, the preprocessing switch 56 sends the waste oil to the microwave heating section 64. The cutoff percentage of water is around 5% to 10% water by volume. When the percentage of water is below the predetermined threshold the preprocessing switch 56 sends the waste oil to the conventional heating section 60. Below a certain percentage of water the oil does not have to be purified. An output tank is connected to the preprocessing switch. The approximate percentage for no processing is around 6% water by volume. This oil can be used for heating oil. However, there may be circumstances in which it still makes economic sense to process this waste oil. Oil with a lower water content is more valuable, possibly even more value than #2 oil. Note that the preprocessing switch can be changed dynamically. As a tank of waste oil is processed the initial stream of oil will contain a higher percentage of water, since the waste oil at the bottom of the tank is processed first. As the tank is drawn down the percentage of water in the oil will decrease.

In one embodiment, the preprocessing analyzer is a net oil analyzer. In another embodiment, the preprocessing analyzer is a dielectric sensor model # SKS/65-5008 from Kavlico.

The demulsification section 66 can use any standard demulsification method. In one embodiment the demulsification section 66 uses chemical (often polmeric) demulsifiers.

Figure 4:
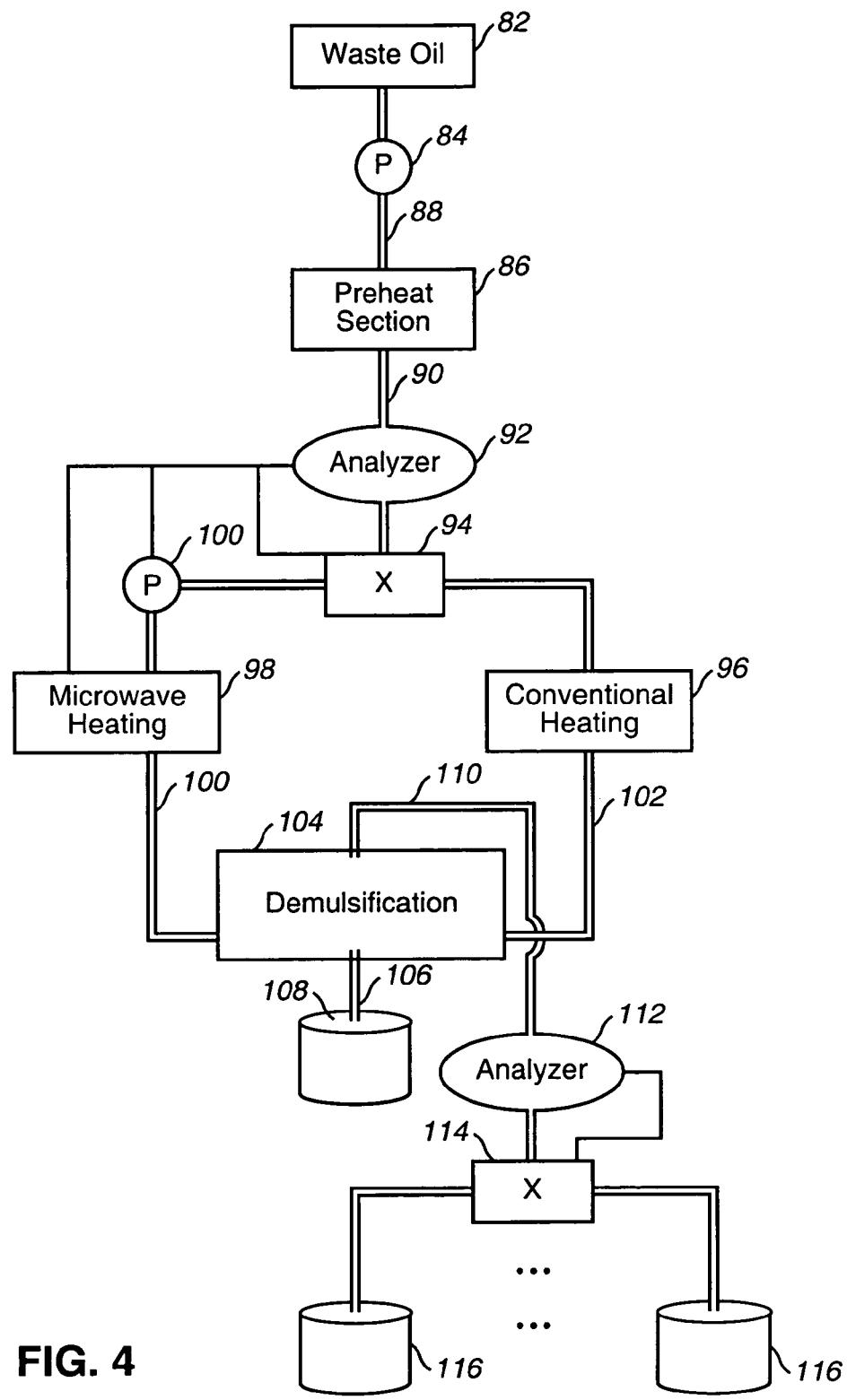

FIG. 4 is a block diagram of a system 80 for purifying waste oil. A waste oil stream 82 is connected to a pump 84. The pump 84 is a cold oil pump. A preheat section 86 heats the waste oil stream 88. Often, the pre-heat section is a conventional resistance heater, heat pump or heat exchanger utilizing heat from later in the process. The heated waste oil stream 90 is connected to an analyzer section 92. The analyzer section 92 determines the percentage of water in the stream. A switch (fluid switch) 94 is controlled by the analyzer section 92. The switch 94 diverts the heated waste oil to either a conventional heating section 96 or a microwave heating section 98. A hot oil pump 100 is controlled by the analyzer 92 and adjusts the flow rate of the waste oil through the microwave heating section 98 based on the percentage of water. The amplitude (energy) of the heating microwaves is also controlled by the analyzer 92. The output 100 of the microwave heating section 98 and the output of the conventional heating section 96 is connected to a demulsification section 104. There are two outputs from the demulsification section 104. A waste output 106 is connected to a bottom of the demulsification section 104 and is held in a waste tank 108. The waste output contains solid waste, water and some water/oil emulsion. A purified output 110 is connected to a post-processing analyzer 112. The post processing analyzer (output analyzer) 112 determines a post percentage of water (output percentage of water). A post processing switch (output switch) 114 is controlled by the analyzer 112 and diverts the oil to one of a plurality of processed oil tanks 116 based on a percentage of water. The percentage of water in the purified oil effects its market value and use. In one embodiment, the preheat section 86 obtains its energy from the heated oil exiting the demulsification section 104 (trapping vessel). This heat transfer can be accomplished by a number of methods that will be apparent to those skilled in the art. In one embodiment, the conventional heater is a heating oil fired heater or gas heater. The system 80 is a continuous process that provides economic advantages over bulk processing systems.

Figure 5:
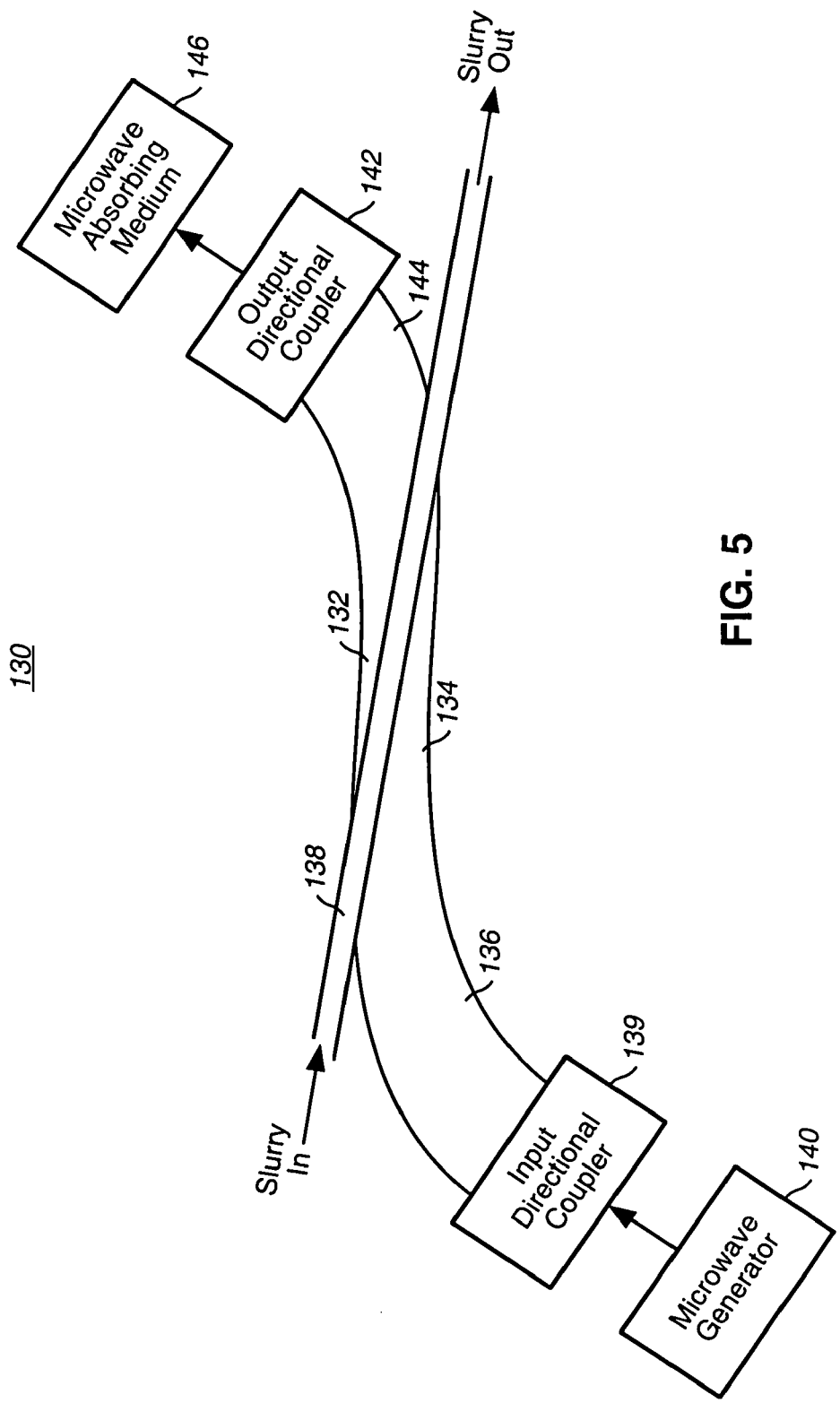
FIG. 5 is schematic diagram of a heating step using microwave heating.

FIG. 5 is schematic diagram of a microwave heating section 130. The microwave heating section has a microwave heating cavity having a single mode waveguide 132 with a straight member 134 and a first end (curved input and output ends). The first end (input) is a curved member having a 45 "H"-plane bend of miter construction. A slurry (dielectric tube) 138 extends through the straight section. The waste oil flows through the slurry 138. In the illustrated embodiment, the slurry conduit is a glass tube. The slurry (dielectric tube) 138 enters the straight member 134 at an edge of the waveguide 132 and exits the straight member 134 is a center of the waveguide. Note that the waveguide 132 has rectangular cross section and is approximately twice as wide as it tall. The drawing shows the width of the waveguide. The arrangement of the slurry 138 has certain advantages. For instance, if the waste oil contains a material that causes a discontinuity the reflected energy will be smaller as it enters the waveguide. This allows the discontinuity to be detected before it damages the equipment.

An input directional coupler 139 is connected between the single mode waveguide 132 and a microwave generator 140. The input directional coupler (sensor) measures a reflected energy that can be used to determine if there is a problem in the waveguide. An output directional coupler 142 is connected to a second end to 144 of the waveguide 132. The second end (output) is a curved member having a 45 "H"-plane bend of miter construction. A microwave absorbing medium 146 is connected to the output directional coupler 142. The microwave absorbing medium 146 eliminates reflections when the microwave energy is not completely absorbed by the waste oil in the slurry 138. The microwave heating section is designed so that 100% of the input microwave energy is absorbed by the waste oil, but some residual energy may remain for oil with low water content.

In one embodiment, a second microwave heating section is in parallel with the microwave heating section. When a problem is detected by the input directional coupler, the waste oil is switched to the second microwave heating section.

The microwave heating efficiency is directly related to the percentage of water in the emulsion. The heating depends on the residence time and the amplitude of the microwave energy. The residence time depends upon the fluid velocity of the emulsion and on the length of the interaction region defined by the slurry 138 in the waveguide 132. Ultimately, the amount of microwave energy absorbed by the emulsion depends upon the flow rate and the power output of the microwave generator 140.

For example, assume a small scale processing system designed to treat 9.45 liters per minute (2.5 gallons per minute). The effective volumetric flow rate, V, of the oil and the water in the emulsion is calculated by multiplying the total volumetric flow rate of the emulsion by the percentage of the emulsion that the fluid comprises. The mass flow rate, m, for each component is $$m = V\rho \quad (1)$$

wherein ρ is the density of the fluid. Given that the density of oil is 0.85 kg/l and the density of water is 1.0 kg/l and, further, assuming that the emulsion includes 90% oil and 10% water by volume, the effective volumetric flow rates of the oil and water are 8.51 l/min (2.25 gal/min) and 0.945 l/min (0.25 gal/min), respectively. Accordingly, the mass flow rate of the oil and the water are 7.23 kg/min and 0.945 kg/min, respectively.

The emulsion is drawn from the waste oil reservoir and preheated by the preheat section 86. The energy output, E, of the preheating section to raise the temperature of the each fluid in the emulsion is $$E = mc_p \Delta T \quad (2)$$

where ΔT is temperature change and $c_p$ is the specific heat of the fluid. In the illustrated embodiment, the preheat section preheats the emulsion to a temperature of 60° C. Assuming that the initial temperature of the emulsion is 20° C. (ΔT=40° C.) and given that the specific heats, $c_p$, of oil and water at 20° C. are 0.45 cal/g° C. and 1.0 cal/g° C., respectively, the energy output of the preheating section is 9.08 kW for the oil plus 2.64 kW for the water, a combined total of 11.72 kW.

Each fluid within the emulsion has a loss tangent, α, for microwaves at a given frequency. At 2.45 GHz, the frequency of the microwaves used in the small scale processing system, the loss tangents of oil and water are 0.0084 and 0.12, respectively. A comparison of the microwave loss tangents of the oil and water shows that the water will absorb 93% of the available microwave energy at 2.45 GHz. This relationship permits the rapid heating of the water with little change in the temperature of the oil. For a microwave generator with a power output of 6 kW at 2.45 GHz applied to the emulsion flowing at 8.51 liters per minute, the oil temperature increases by 1.85° C. while the water temperature increases by 79.0° C., for a maximum of 139.0° C.

This example shows heating the water above a boiling point, however this is not necessary in most cases. The residence time is determined by multiplying the fluid velocity, v, by the length, l, of the slurry in the waveguide. For the small scale processing system, this length is six feet. The conduit has an inside diameter of 0.75 inch. The resulting fluid velocity, v, is 217.8 ft/min. The residence time, t, is 1.65 seconds which is sufficient to prevent significant thermal conduction between the water and the oil prior to separation. In large scale processing systems there maybe advantages to using microwave generators with a different frequency. One skilled in the art will be able to determine how the fluid velocity and microwave energy needs to be adjusted to achieve the desired results.

Figure 6:
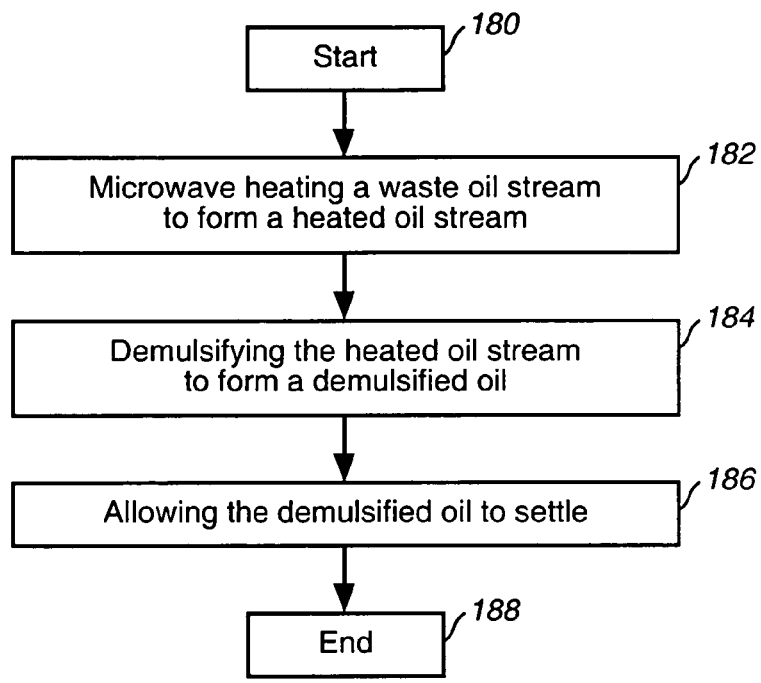
FIG. 6 is a flow chart of the process steps used for purifying waste oil in accordance with one embodiment of the inventive process.

FIG. 6 is a flow chart of the steps used in a process for purifying waste oil. The process starts, step 180, by microwave heating a waste oil stream to form a heated oil stream at step 182. The heated oil stream is demulsified to form a demulsified oil at step 184. At step 186, the demulsified oil is allowed to settle which ends the process at step 188. A top portion of the demulsified and purified oil is drawn from a tank. The demulsified oil is tested for a percentage of =water. The demulsified oil is stored in one of a plurality of tanks based on the percentage of water.

In one embodiment, a percentage of water is determined for the waste oil stream. A flow rate of the waste oil stream is adjusted based on the percentage of water. The amplitude of the heating microwave may also be adjusted based on the percentage of water. In another embodiment the waste oil stream is preheated before the microwave heating. In one embodiment a chemical demulsifier is mixed into the heated oil stream.

Figure 7A:
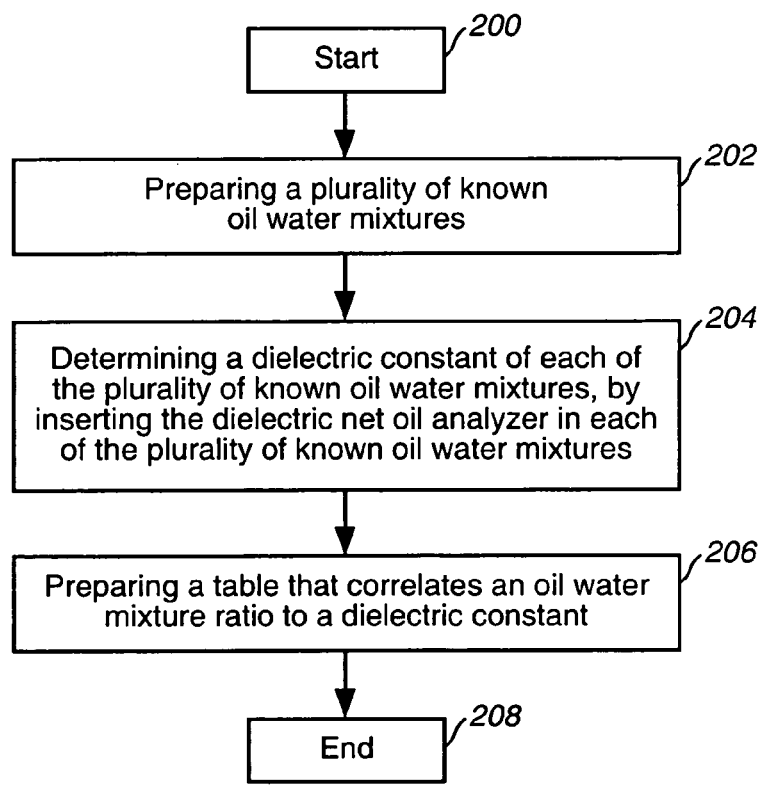
FIG. 7a is a flow chart of the process steps used in a process of calibrating a dielectric net oil analyzer.
Figure 7B:
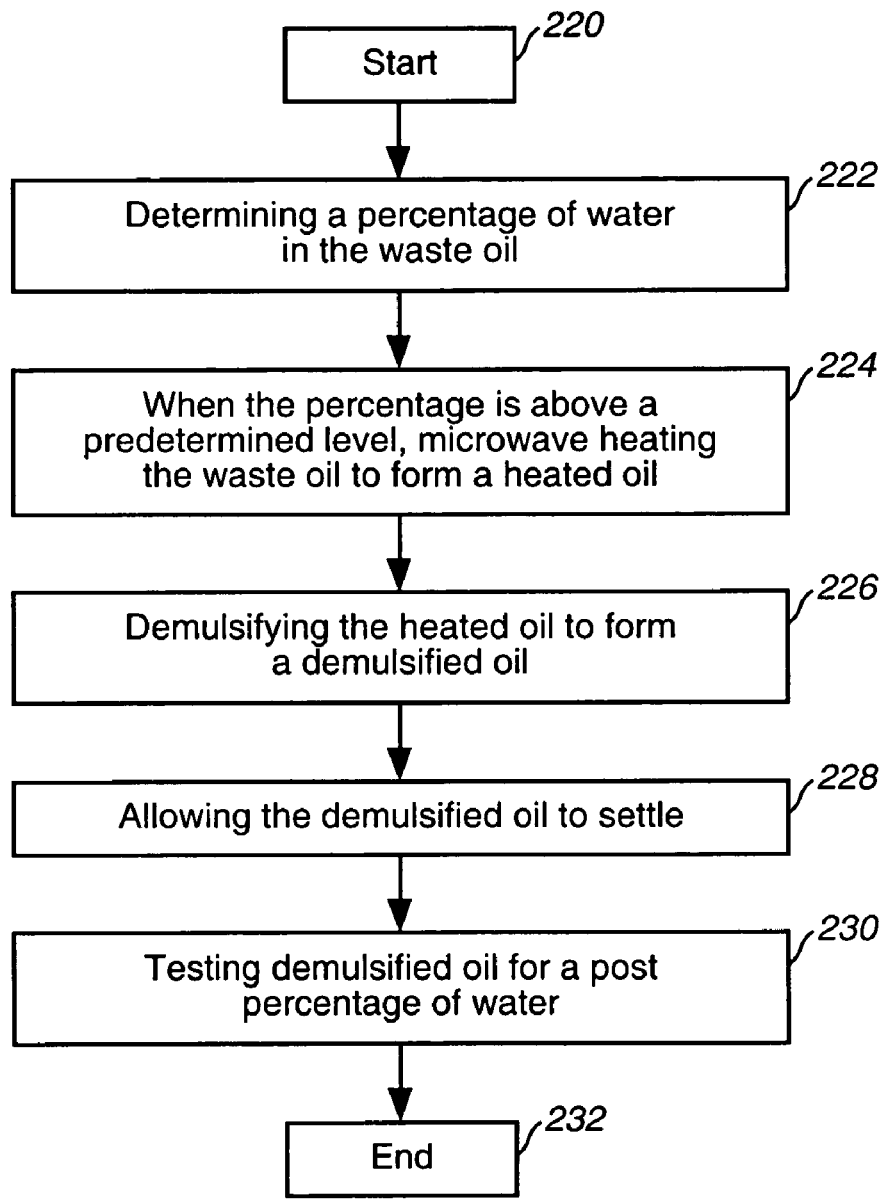
FIG. 7b is a flow chart of the process steps used for purifying waste oil in accordance with one embodiment of the inventive process.

FIG. 7a is a flow chart of the steps used in a process of calibrating a dielectric net oil analyzer. The process starts, step 200, by preparing a plurality of known oil water mixtures at step 202. A dielectric constant is determined for each of the plurality of known oil water mixtures at step 204.

This dielectric net oil analyzer is inserted into each of the plurality of known oil water mixtures. At step 206 a table is prepared that correlates an oil water mixture ratio to a dielectric constant which ends the process at step 208. In one embodiment, an oil water mixture is one hundred percent water and a second oil water mixture is one hundred percent oil.

Figure 8:
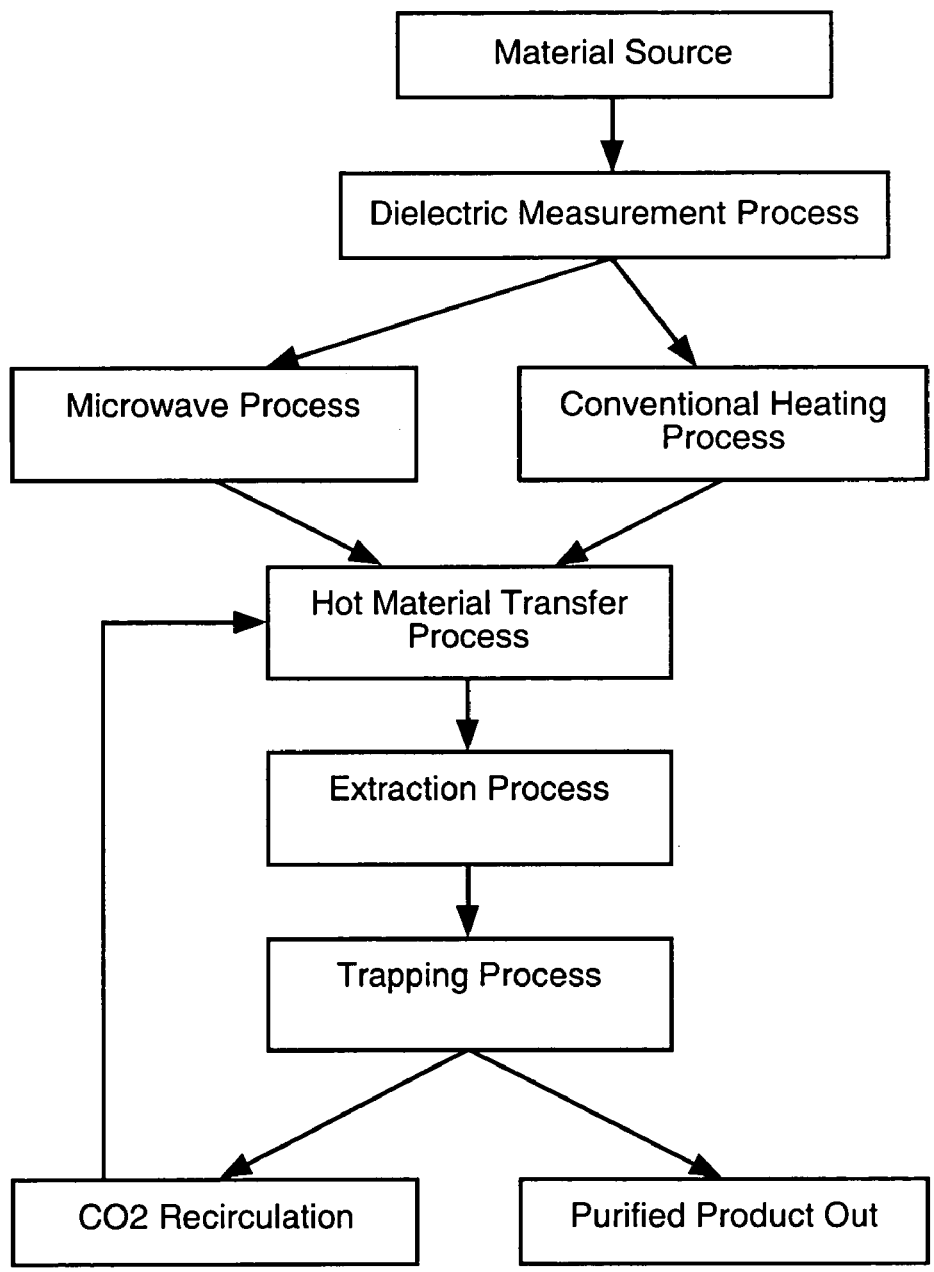
FIG. 8 is a flow chart of the process steps used for purifying waste oil.

FIG. 8 is a flow chart of the steps used in a process for purifying waste oil. The process starts, step 220, by determining a percentage of water in the waste oil at step 222. When the percentage is above a predetermined level, the waste oil is microwave heated to form a heated oil stream at step 224. The heated oil is demulsified at step 226. The demulsified oil is allowed to settle at step 228. At step 230, the demulsified oil is tested for a post percentage of water that ends the process at step 232. The demulsified oil is directed to one of a plurality of holding tanks based on the post percentage of water. A top portion of the demulsified oil is continuously drawn off to a processed oil storage tank.

When the percentage of water is not above the predetermined level, the waste oil is conventionally heated to form a heated oil. In one embodiment, the waste oil is preheated. In one embodiment, a microwave energy is adjusted based on the percentage of water. In another embodiment, a time the waste oil is exposed to the microwave heating is adjusted based on the percentage of water.

EXAMPLES

Demulsification before Heating

Case 1: Conventional Heating 100 mL of slop oil having an estimated 11% water by volume was dosed with 3000 ppm of 906 polymeric demulsifier (Midwestern Custom Chemicals). The sample then was place in a 60° C. hot water bath for thirteen hours. The sample was then allowed to cool for eleven hours. A visual measurement showed 2% water released four hours after the start of heating. The sample still had 2% water released (by volume) after allowing it to cool for eleven hours.

Case 2: Microwave Heating-1

Slop oil having an estimated 11% water by volume (same as above case 1) was dosed with 3000 ppm of 906 demulsifier from Midwestern Custom Chemicals. Note that this case was a semi-continuous processing, while case 1 was a batch processing. The oil was then heated by microwave energy to approximately 49° C. The oil was then placed in a 60° C. hot water bath for thirteen hours. The sample was then allowed to cool for eleven hours. 100 mL samples were drawn off for testing. At four hours after being placed in the hot water bath the sample showed 25% water released by volume. After allowing the oil to cool for eleven hours the sample showed virtually all water released.

Case 3: Microwave Heating-2

This case is similar to case 2 except the oil was not placed in the hot water bath. After the microwave heating the sample was allowed to cool to ambient temperature. The sample showed no visual sign of separation.

Heating before Demulsification

Case 4: Conventional Heating 100 mL (milliLiters) of slop oil having an estimated 12% water by distillation was placed in a 60° C. hot water bath until the oil reached approximately 60° C. The oil was then dosed with 2000 ppm of 923 demulsifier. The oil was allowed to set in the hot bath for 10 minutes. The oil was then cooled to ambient and measured. The measurement showed 15% water released and 5% rag.

Case 5: Microwave Heating 100 mL (milliLiters) of slop oil having an estimated 12% water (same as case 4) by distillation was microwave heated to 60° C. The oil was then dosed with 2000 ppm of 923 demulsifier manufactured by Tetra. The oil was allowed to set in the hot bath for 10 minutes. The oil was then cooled to ambient and measured. The measurement showed 17% water released and 3% rag.

Case 6: Conventional Heating

This case uses the same procedure as case 4 except the demulsifier is ECO91 (Emulsion Controls, Chula Vista, Calif.) and the starting slop oil was estimated to have 38% water by distillation. The sample showed 23% water released.

Case 7: Microwave Heating

This case uses the same procedure as case 5 except the demulsifier is ECO91 and the starting slop oil was estimated to have 38% water by distillation. The sample showed 25% water released.

Demulsification before Heating

Case 8: Microwave Heating

Starting with the same sample of slop oil as in case 4 and case 5, the oil was dosed with 2000 ppm 923. The oil was then microwave heated to 60° C. and allowed to set in the hot bath for 10 minutes. The oil was then cooled to ambient and measured. The measurement showed 15% water released and 5% rag. The same result as case 4.

Case 9: Microwave Heating

This case used the same procedure as case 8 except the starting slop oil was the same as in case 6 and case 7. The measurement showed 13% water released.

The examples show that in many cases microwave heating provides an advantage over conventional heating. In addition, adding the demulsifier after heating provides better results than adding the demulsifier before heating the oil. Thus a system that can automatically switch between conventional heating and microwave heating allows the waste oil to be efficiently heated and provide oil with the lowest water content.

I claim:

1. An apparatus for purifying waste oil, comprising:
    (a) a preprocessing analyzer section connected to an input stream for waste oil and an output;
    (b) a preprocessing switch controlled by the analyzer section having an input connected to an analyzer section output and an output, the preprocessing switch having a first output and a second output;
    (c) a heating section connected to the first output of the preprocessing switch and a microwave heating section connected to the second output; and
    (d) a demulsification section connected a heating output and having an output lower for settling.

2. The apparatus for purifying waste oil of claim 1 wherein the apparatus further comprises a preheating section connected before the preprocessing switch.

3. The apparatus of claim 2, wherein the microwave heating section includes a waveguide having a straight member between a first end and a second end, the first end is a curved member having a 45° "H"-plane bend of miter construction.

4. The apparatus of claim 3, wherein the microwave heating section includes a sensor that determines a reflected energy.

5. The apparatus for purifying waste oil of claim 3 wherein the second end of the waveguide is a curved member having a 45° "H" plane bend of miter construction.

6. The apparatus for purifying waste oil of claim 1, wherein the apparatus further comprises a post processing analyzer section connected to a demulsifier output, and a post-processing analyzer section output of the post-processing analyzer section.

7. An apparatus for purifying waste oil, comprising:
   (a) a pump connected to the supply of waste oil creating a waste oil stream;
   (b) a microwave heating section heating the waste oil stream to form a heated oil steam; and
   (c) a demulsification section having a super critical $CO_2$ inlet and a settling outlet lower than the inlet and connected to microwave heating section.

8. The apparatus for purifying waste oil of claim 7 wherein the apparatus further comprises an analyzer section after the pump that determines a percentage of water in the waste oil stream feed.

9. The apparatus for purifying waste oil of claim 8 wherein the microwave heating section further comprises a sensor connected to the microwave generator for determining an amount of reflected energy.

* * * * *